(12) United States Patent
Goto

(10) Patent No.: US 7,634,261 B2
(45) Date of Patent: Dec. 15, 2009

(54) MOBILE COMMUNICATIONS TERMINAL AND SOFTWARE UPDATING METHOD FOR MOBILE COMMUNICATIONS TERMINAL

(75) Inventor: Mitsuru Goto, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 1012 days.

(21) Appl. No.: 10/408,722

(22) Filed: Apr. 7, 2003

(65) Prior Publication Data

US 2003/0224761 A1 Dec. 4, 2003

(30) Foreign Application Priority Data

Apr. 8, 2002 (JP) ............................. 2002-105709

(51) Int. Cl.
*H04M 3/00* (2006.01)
(52) U.S. Cl. ...................................... 455/419; 455/418
(58) Field of Classification Search ................. 455/419, 455/418
See application file for complete search history.

(56) References Cited

U.S. PATENT DOCUMENTS

| | | | |
|---|---|---|---|
| 4,484,273 A * | 11/1984 | Stiffler et al. ............... 710/110 |
| 5,664,195 A | 9/1997 | Chatterji |
| 5,754,795 A | 5/1998 | Kuhlman et al. |
| 5,825,649 A | 10/1998 | Yoshimura |
| 6,023,620 A | 2/2000 | Hansson |
| 6,205,522 B1 | 3/2001 | Hudson et al. |
| 6,687,901 B1 * | 2/2004 | Imamatsu .................... 717/173 |

FOREIGN PATENT DOCUMENTS

JP 2002 91935 3/2002

OTHER PUBLICATIONS

Wireless Application Protocol Forum: "WAP Push Architectural Overview" Nov. 8, 1999 XP002183436.
Digital cellular telecommunications system (Phase 2+); Alphabets and language-specific information (GSM 03.38 version 7.2.0 Release 1998); ETSI TS 100 900 ETSI Standards, European Telecommunicaitons Standards Institute, Sophia-Antipo, FR, vol. SMG4, No. V720, Jul. 1999, XP014005576 ISSN: 0000-0001.
Analog Devices: "AD20MSP430 GSM/GPRS/DCS1800/PCS1900 SoftFone Baseband Chipset" Internet Article, 'Online! 2000, XP002284185 Retrieved from the Internet: <URL:http://www.analog.com/UploadedFiles/Product_Briefs/6621099430chipset.pdf> 'retrieved on Jun. 9, 2004!

* cited by examiner

*Primary Examiner*—William J Deane
(74) *Attorney, Agent, or Firm*—Frommer Lawrence & Haug LLP; William S. Frommer; Thomas F. Presson

(57) ABSTRACT

A mobile communications terminal has a communications processor controlled by a communications CPU and an application control processor controlled by an application CPU. When software program for communications is distributed from the control system side, the application CPU halts the communications processor and carries out update processing of software program of the communications processor. Further, when software program for application is distributed from the control system side, the communications CPU halts the application control processor and carries out updating of software program of the application control processor.

10 Claims, 6 Drawing Sheets

US 7,634,261 B2

MOBILE COMMUNICATIONS TERMINAL AND SOFTWARE UPDATING METHOD FOR MOBILE COMMUNICATIONS TERMINAL

CROSS REFERENCE TO RELATED APPLICATIONS

The present document is based on Japanese Priority Application JP2002-105709, filed in the Japanese Patent Office on Apr. 8, 2002, the contents of which are incorporated herein by reference to the extent permitted by law.

BACKGROUND OF THE INVENTION

1. Field of the Invention

The present invention relates to a mobile communications terminal applied to mobile communications apparatuses such as portable phone devices, PHS (Personal Handyphone System) devices, PDA (Personal Digital Assistants) devices and the like, and, more particularly, relates to a mobile communications terminal of a configuration for dividing each information processing with a plurality of control means, thus enabling updating an information processing program for each control means.

2. Description of the Related Art

Conventionally, when correcting a bug in an operating system of a mobile communications terminal such as a portable phone device, or when a malfunction occurs in one of the communications functions, it is common practice to collect the mobile communications terminal at a manufacturer's retail store, for example, and execute an update of the software of the collected mobile communications terminal.

SUMMARY OF THE PRESENT INVENTION

The execution of updating of software and the like makes it necessary for the user to carry his/her mobile communications terminal to a retail store, for example, constituting a troublesome procedure. In addition, from the manufacturer's viewpoint, the user's mobile communications terminals must be collected one by one in order to execute the update of the software for each device. This is also very troublesome.

Accordingly, the present invention has been conceived in view of a need to provide a mobile communications terminal device capable of executing software updating for the mobile communications terminal and the like, in a simple and convenient way for both the manufacturer and the user.

A mobile communications terminal according to the present invention includes a first control means and a second control means, receives updating software program which is transmitted for updating one of a first software program and a second software program that are respectively executed by the first control means and the second control means, and stores the software program in a storage means. The control means for executing the other of the first software program and the second software program halts execution of the software, while updating the previous one of the software by means of the updating software.

BRIEF DESCRIPTION OF THE DRAWINGS

The above and other objects, features and advantages of the present invention will become more apparent to those skilled in the art from the following description of the presently preferred exemplary embodiments of the invention taken in conjunction with the accompanying drawings, in which.

DESCRIPTION OF THE PREFERRED EMBODIMENTS OF THE PRESENT INVENTION

Figure 1:
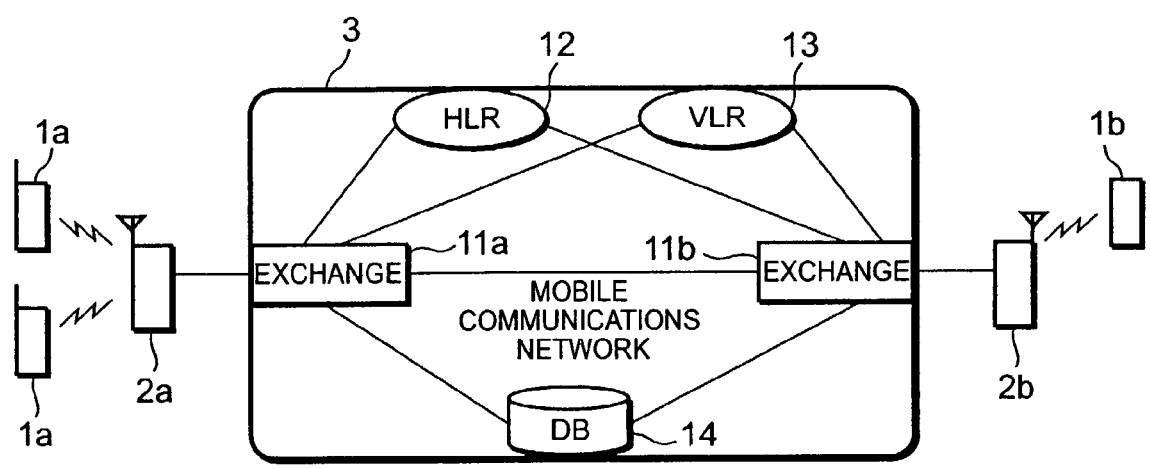
FIG. 1 is a block diagram showing a configuration of a mobile communications terminal incorporated in a mobile communications system according to a preferred embodiment of the present invention.

Preferred embodiments of the present invention will now be described in detail below with reference to the accompanying drawings. The present invention, for example, is applicable to a mobile communications terminal in a mobile communications system of a configuration as illustrated in FIG. 1.

A mobile communications system according to a preferred embodiment of the present invention includes connecting by wireless means a plurality of mobile communications terminals 1 (1a and 1b) to a plurality of base stations 2 and connecting by cable each of the base stations 2 (2a and 2b) to a control system performing communications control of each of the mobile communications terminals 1.

A control system 3 includes interconnecting a plurality of exchanges 11 (11a and 11b in FIG. 1) to an HLR (Home Location Register) control device 12, a VLR (Visitor Location Register) control device 13, and a database 14 through a mobile communications network.

In such a mobile communications system, when communications data from the mobile communications terminal 1a are received by the HLR control device 12 and the VLR control device 13 via the base station 2 and the exchange 11, by reference to subscribers data stored in the database 14, positional information on the mobile communications terminal 1b and the like, and communications data from the mobile communications terminal 1a are transmitted to an exchange 11b handling communications of a mobile communications terminal 1b; such exchange 11b transmits the communications data to a base station 2b closest to the mobile communications terminal 1b and the base station 2b transmits communications data via radio to the mobile communications terminal 1b. This makes it possible to carry out communications between the mobile communications terminal 1a and the mobile communications terminal 1b.

In addition, in the case of the mobile communications system according to the present preferred embodiment, software for improving the operating system, application software designed to improve and expand communications functions of the mobile communications terminal 1 and the like are stored in the database 14. Still further, in the database 14 there is stored software for a standby screen, an incoming melody, a font display and the like.

The software stored in the database 14 is transmitted arbitrarily or compulsorily by the HLR control device 12 and the VLR control device 13 to the user's mobile communications terminal 1. This enables the operating system, the application system, the standby screen, and the like to be arbitrarily or compulsorily updated in the user's mobile communication terminal 1. Details will be described below.

[Mobile Communications Terminal]

Next, as the mobile communications terminal 1, in addition to a portable phone device and a PHS (Personal Handyphone System) device, a PDA (Personal Digital Assistant) may be applied. A case in point in the present example of preferred embodiment is the mobile communications terminal 1 described below as a portable phone device.

Figure 2:
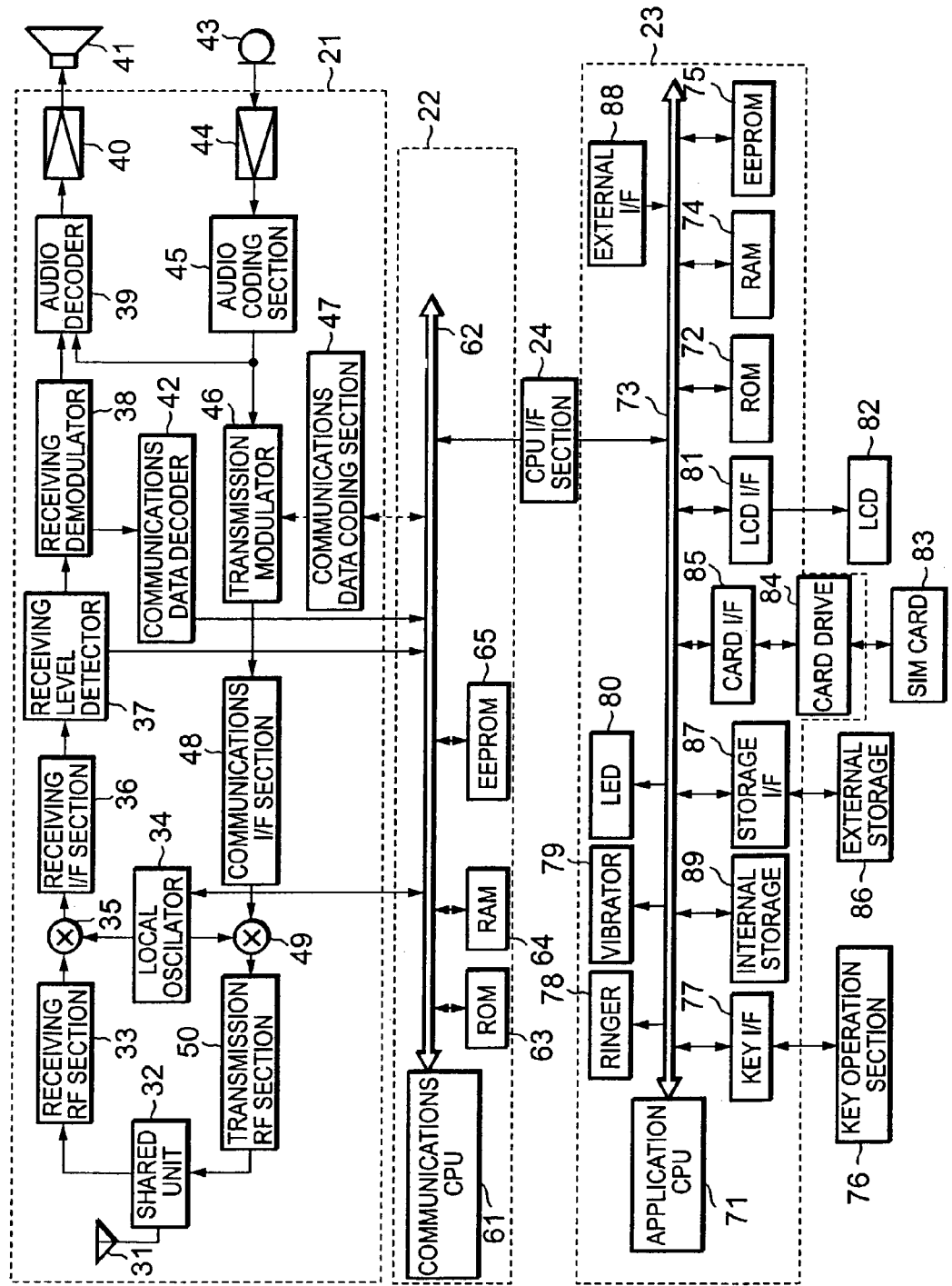
FIG. 2 is a block diagram showing a mobile communications terminal to which a preferred embodiment of the present invention is applied.

As shown in FIG. 2, the mobile communications terminal 1 is provided with a transmitting-receiving signal processor 21, a communications processor 22, and an application control processor 23, wherein the communications processor 22 and the application control processor 23 are connected via a CPU interface section 24 (CPU I/F section).

[Configuration of a Plurality of CPUs]

The provision of two CPUs which include the communications control section 61 (communications CPU) and the application control section 71 (application CPU) is a feature of the mobile communications terminal according to the example of preferred embodiment of the present invention.

Although in this example a CPU is provided on the communications side as well as on the application side, the function of the mobile communications terminal 1 may be divided by three or more, so that there may be arranged a configuration having a CPU for each function, so that there may be three or more CPUs.

[At Time of Receiving]

At time of receiving, when the transmitting-receiving signal processor 21 receives a radio wave from the base station 2 by an antenna 31 of the mobile communications terminal 1, a receiving signal is transmitted to a receiving RF section 33 via a shared unit 32. The receiving signal transmitted to the receiving RF section 33 is down-converted by the receiving RF section 33 to a low frequency component and mixed by a signal mixer 35 with a signal from a local oscillator 34 to form a constant frequency, which is then transmitted to the receiving I/F section 36 and A/D converted to become receiving data.

The receiving data, after a receiving level is detected by a receiving level detector 37, is subjected to processing to eliminate influence such as fading, and decoding processing such as data type discriminating processing, de-interleave processing and error correction processing by means of a receiving demodulator 38 and separation of audio data from other communications data is carried out.

Audio data are sent from the receiving demodulator 38 to an audio decoder 39 and an A/D converted to become an analog audio signal, which is processed for amplification by a predetermined gain through an amplifier 40 and supplied to a speaker 41. This makes it possible to acquire a sound output received via the speaker 41.

On the other hand, communications data are decoded by a communications data decoder 42 into a data format that can be processed by the communications processor 22 and the application control processor 23, and it is outputted to the communications processor 22.

[At Time of Transmitting]

Next, when transmitting audio data by a radio wave in the transmitting-receiving signal processor 21, after an analog audio signal inputted via a microphone 43 is adjusted to a predetermined level by the amplifier 44, the data are subjected to additional processing such as A/D conversion processing, compression processing, interleave processing, and error correction processing in a audio coding section 45, and sent to a transmission modulator 46 as audio data.

Further, when transmitting communications data by radio wave in the transmitting-receiving signal processor 21, communications data inputted from the communications processor 22 are subjected to processing such as compression processing, interleave processing, and additional processing of error correction code, and sent to the transmission modulator 46.

In the transmission modulator 46, inputted audio data and communications data are subjected to modulation processing and phase conversion to an I/Q component for conversion to a predetermined frequency, then, they are sent to a transmitting I/F section 48 as transmitting data. These transmitting data are D/A converted in the transmitting I/F section 48 to serve as a transmitting signal of the analog type. For converting this transmitting signal into a predetermined transmitting frequency, it is mixed in a signal mixer 49 with a signal for conversion from the local oscillator 34. After it is up-converted to a high frequency component in the transmitting RF section 50 and converted to an RF frequency, it is transmitted as a radio wave via the shared unit 32 and the antenna 31.

Signal processing in the transmitting-receiving signal processor 21 is controlled by the communications CPU 61 of the communications processor 22. The communications CPU 61 is connected via a bus line 62 for communications to a ROM (Read Only Memory) 63, RAM (Random Access Memory) 64, and EEPROM (Electrically Erasable and programmable Read Only Memory) 65, performing various communications control processing according to communications control software stored in the ROM 63. At this instant, the RAM 64 is used as a work area of the communications CPU 61, storing data in the middle of computation as necessary while the communications CPU 61 software is being executed or storing temporarily data for transmitting to and receiving from each of other sections.

The EEPROM 65 is a nonvolatile memory, so that even if power of the mobile communications terminal 1 is turned off, for example, information such as a parameter of a communications setting condition immediately before can be stored. When power is on for a next operation, the communications CPU 61 is so. designed that a setting immediately before power is turned off can be reproduced by performing setting control of each section based on the parameter stored in the EEPROM 65.

In the communications processor 22, there is performed communications control processing such as selection of a signal outputted from the local oscillator 34, where it is mixed with a receiving signal and a transmitting signal by the communications control software, and detection of a wave condition corresponding to a receiving level.

The application control processor 23 realizes an application function of a mobile communications terminal 1 such as a user interface. The application CPU 71 activates application software stored in a ROM 72 and controls each section connected via a bus line 73 for application. At this instant, a RAM 74 is used as a work area of the application CPU 71, and the EEPROM 75 stores an application setting condition and other data. Further, in the ROM 72 there are data such as stored font data for displaying characters on a display 82 (LCD) sound sample data to acquire a sound output by a ringer 78, and vibration patterns by a vibrator 79.

When a key operation section 76 is operated by the user in the mobile communications terminal 1, its operating content is detected by a key I/F 77 and application processing according to key operation is performed by means of the application CPU 71.

Further, the application CPU 71 functions to drive the ringer 78, the vibrator 79, and an LED (Light Emitting Diode) 80 to notify the user of a call, and displays and controls a standby image and various types of message on the display 82 via an LCD I/F 81.

Still further, when a SIM card 83 (Subscriber Identity Module Card) is inserted, the application CPU 71 reads out an individual ID such as user's telephone number via a card drive 84, and performs user authentication by feeding this information to the communications CPU 61 via a card I/F 85 and a CPU I/F 24.

Furthermore, when an external storage 86 is attached to the mobile communications terminal 1, the application CPU 71 reads out its content via storage I/F 87 and feeds it to the communications CPU 61 or the application CPU 71.

Moreover, the external storage 86 which may have, for example, a stick shape or a card shape semiconductor memory is made attachable to the mobile communications terminal 1. The external storage 86 has a large storage capacity, for example, 8 MB, 16 MB, 32 MB, 64 MB, and the like. Software such as software program for improving an operating system as downloaded from the above-mentioned database 14, application software for improving and expanding communications function, and software program for standby screens, incoming melodies, and fonts are arranged to be stored temporarily in the external storage 86.

Although detailed description will be given later, the communications CPU 61 and the application CPU 71 read out software stored in the external storage 86 at a predetermined timing and perform rewrite control (upgrading or updating) of existing software.

It should be noted that when the external storage 86 is not attached, the above-mentioned downloaded software is temporarily stored in an internal storage 89. Even in this case, the communications CPU 61 and the application CPU 71 are arranged to read out software stored in the internal storage 89 at a predetermined timing and perform rewrite control (upgrading or updating) of existing software.

Next, referring to the present example, description will proceed with each software for the above-mentioned upgrading which is to be downloaded from the above-mentioned database 14. In the mobile communications terminal 1, there is installed an external interface 88 (external I/F) for connecting the mobile communications terminal 1 via connecting cable to an external device such as a computer, so that each software for the above-mentioned upgrade may be inputted via cable through the external I/F 88.

On the other hand, when software for the application CPU 71 is inputted via the external I/F 88, this software is temporarily stored in the internal storage 89 via the bus line 73 for application or temporarily stored in the external storage 86 via the bus line 73 for application and the storage I/F 87. In addition, at a predetermined timing, it is read out from the internal storage 89 or the external storage 86 to be appropriately processed by the application CPU 71.

It is to be noted that the external I/F 88 may be installed on the communications control processor 22 side by connecting it to the bus line 62 for communications. In this instance, software for the application CPU 71 and software for the communications CPU 61 which are inputted via the external I/F 88 are temporarily stored in the internal storage 89 or the external storage 86 respectively via the CPU I/F 14 and the bus line 73 for application.

Then, at a predetermined timing, the software is read out from the internal storage 89 or the external storage 86. In case of the software for the communications CPU 61, it is supplied to the communications control processor 22 side via the bus line 73 for application and the CPU I/F 24 to be appropriately processed by the communications CPU 61. The software for the application CPU 71 is appropriately processed by the application CPU 71.

[Operation of the Mobile Communications Terminal]

Next, execution of an update of the software for communications or the software for application by means of the mobile communications terminal 1 will be described.

[Software Download]

There are two cases of updating software: when the user arbitrarily connects his mobile communications terminal 1 to the control system 3 for downloading and when the control system 3 side compulsorily distributes and downloads to the users' mobile communications terminal 1.

[When Arbitrarily Downloading Software]

Figure 3:
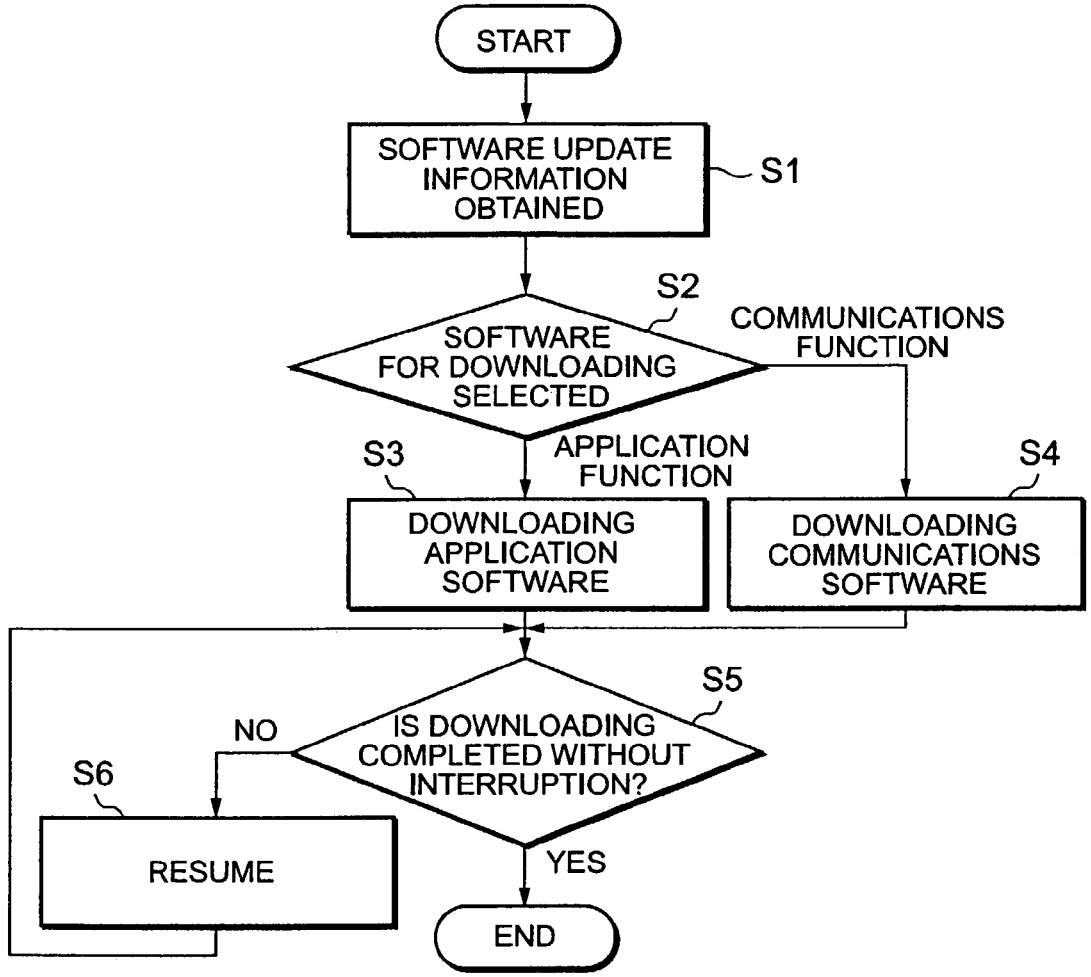
FIG. 3 is a flowchart describing a process up to a download of software upon the user's access to a control system, according to a preferred embodiment of the present invention.

First, a flowchart of FIG. 3 shows a flow when the user arbitrarily connects his mobile communications terminal 1 to the control system 3 to carry out the above-mentioned software downloading.

For example, the user who learned of new software for communications or for application in magazine advertising or TV commercials operates the key operation section 76 at a desired timing and specifies downloading the software. The flowchart starts when the communications CPU 61 detects the user's operation to specify downloading of the software.

In step S1, the communications CPU 61 controls the transmitting-receiving signal processor 21, establishes a communications line between the mobile communications terminal 1 and the control system 3, and acquires updating information on the software from the control system. The application CPU 71 displays and controls a download selection screen corresponding to the acquired update information on the display 82.

Figure 4:
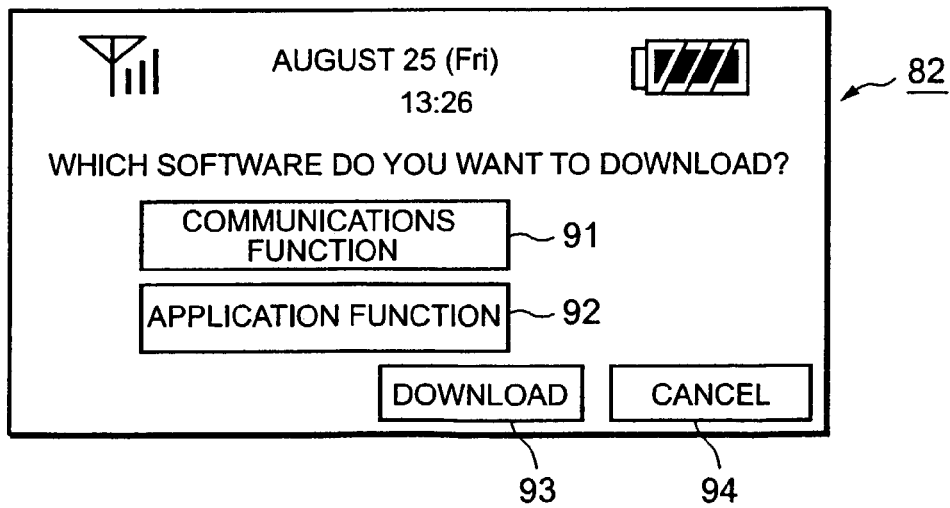
FIG. 4 is a diagram showing a selection screen of software to be updated.

FIG. 4 is an example of this download selection screen. This example shows a download selection screen when acquiring update information indicating that the software for communications and the software for application exist on the control system 3 side.

In this case, together with a message "Which software do you want to download?" the application CPU 71 displays and controls on the display 82 a communications function selection button 91 to specify downloading software for communications, an application function selection button 92 to specify downloading software for application, a download start specifying button 93 to specify starting downloading selected software, and a cancel button 94 to specify canceling downloading selected software.

Further, when only one of the software for communications or the software for application exists on the control system 3 side, only the communications function selection button 91 or the application function selection button 92 indicating this software that exists thereon is displayed and controlled on the display 82.

With the above-mentioned communications function selection button 91 or the application function selection button 92, the user selects desired software, and with the download start specifying button 93, specifies starting a download of the above-mentioned selected software.

In step S2, the communications CPU 61 verifies which software of the software for application and the software for communications is selected. Then, when the software for communications is selected, a request is made to the control system 3 to download the software for communications. When the software for application is selected, a request is made to the control system 3 to download the software for application.

The control system 3 reads out the requested software from the database 14 and distributes it. As a result, in step S3, the software for application is downloaded to the user's mobile communications terminal 1, or in step S4, the software for communications is downloaded to the user's mobile communications terminal 1.

In step S5, the communications CPU 61, by verifying whether or not all data of the software have been downloaded without interruption, monitors the process of this downloading from start to end.

When distributing the software, the control system 3 transmits data showing the entire amount of information on the software to be distributed first to the mobile communications terminal 1. The communications CPU 61 of the mobile communications terminal 1, based on the data showing the entire amount of information, recognizes in advance the entire amount of information of the software to be transmitted from the control system 3 and flags whenever the downloading of this software completes up to a predetermined byte.

When the download is interrupted, no flag is set from the position of the interrupted data. Consequently, the communications CPU 61, when the download is interrupted, makes a request, in step S3, to resume data transmission from the interrupted position. This enables data transmission to resume. The mobile communications terminal 1, by receiving the data thus transmitted again, resumes downloading the data from the above-mentioned interrupted position (Resume Function).

In step S5, this resume operation is repetitively executed by the communications CPU 61 without interruption until it is verified that the entire data of the software has been completely downloaded.

Moreover, in step S5, at timing as verified by the communications CPU 61 that the entire data of the software has been completely downloaded without interruption, the download process shown in the flowchart of FIG. 3 is completed.

[When Compulsorily Distributing Software]

Figure 5:
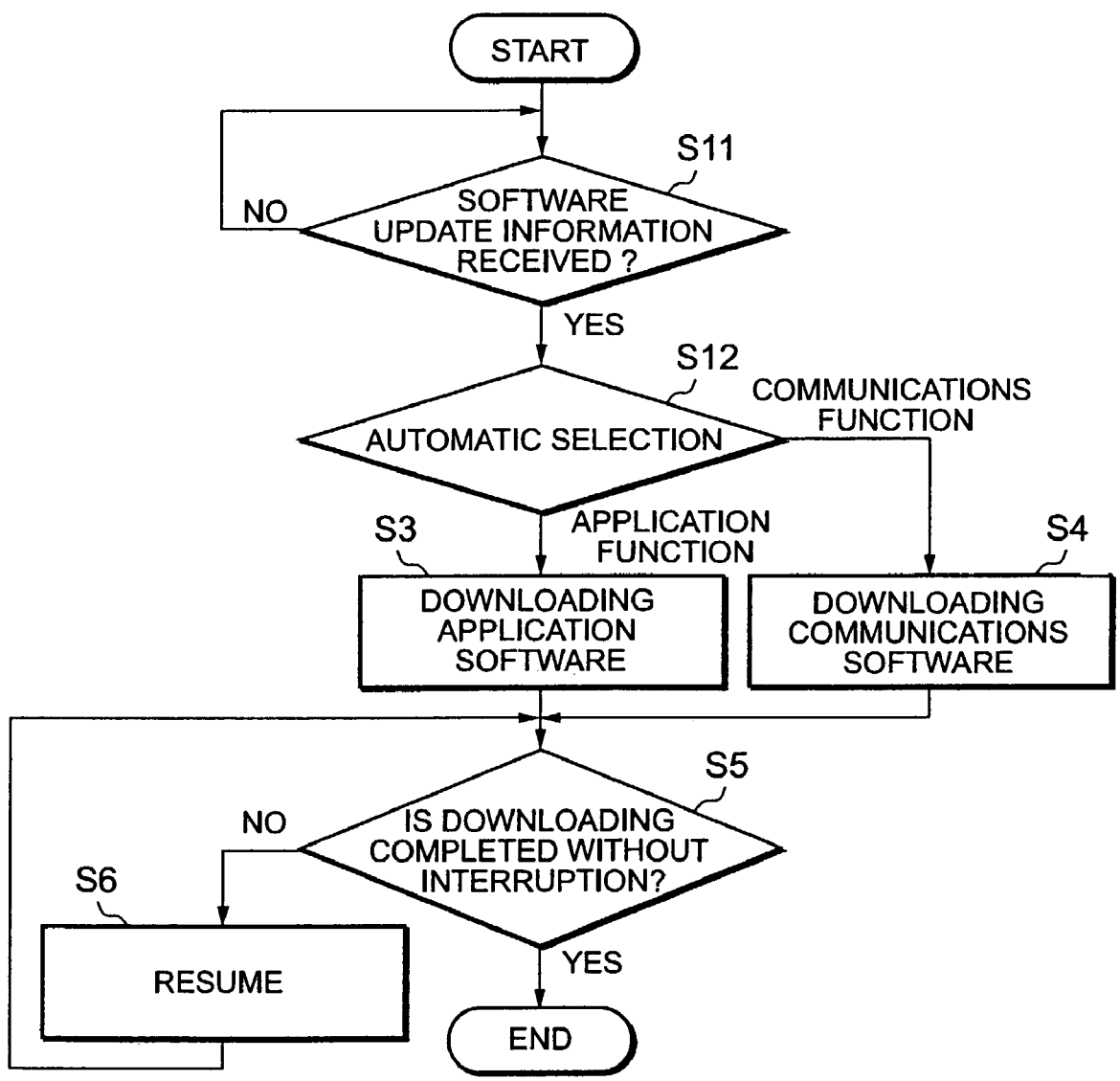
FIG. 5 is a flowchart describing a process up to a download of software upon the user's access to a control system, according to a preferred embodiment of the present invention.

Next, a flowchart of FIG. 5 shows a flow of downloading the software as the control system 3 side compulsorily distributes the software.

For example, when software to correct a bug in an operation system of the mobile communications terminal 1 is developed, when software to correct a malfunction of communications is developed, or when software to improve the processing capacity of a CPU and software to expand communications function are developed, all on the control system 3 side, a download of such software is advantageous to the user.

Hence, the control system 3, in the case of such software advantageous to the user, compulsorily distributes the software to the mobile communications terminal 1 of each user. In distributing for this purpose, the control system 3, prior to distributing the software, distributes "software update information" indicating that the software to be distributed is the software to be compulsorily distributed and "type information (software for application or software for communications)" indicating the type of software to be distributed.

In step S11, the communications CPU 61 verifies whether or not software update information has been received. The communications CPU 61, upon detecting reception of the software update information, verifies the type of software to be distributed in step S12 based on the above-mentioned type information, and in step S3 or in step S4, executes downloading the software for application or the software for communications.

Further, since steps S3 to S6 in FIG. 5 perform the same operations as in steps S3 to S6 of the flowchart in FIG. 3 mentioned above, the same step numbers are provided in both drawings. Also, description of the operations in steps S3 to S6 in FIG. 5 is redundant, therefore, it is omitted here. For details, the description of relevant steps of the flowchart in the above-mentioned FIG. 3 should be referred to.

[Software Updating Process]

Next, the mobile communications terminal 1 performs update processing after downloading software in this manner in order to rewrite the existing software with new downloaded software.

Figure 6:
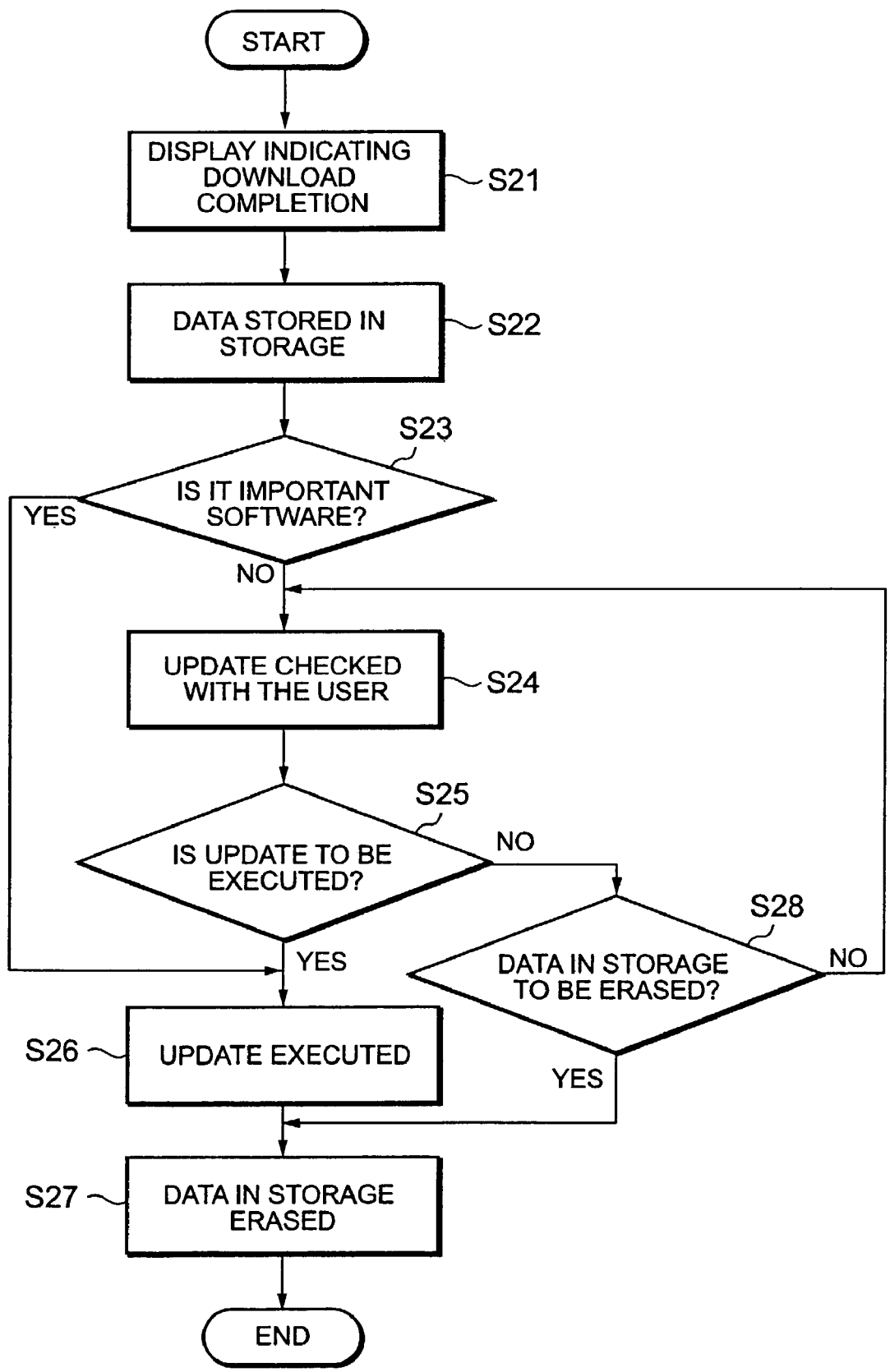
FIG. 6 is a flowchart showing a flow of update processing based on the downloaded software, according to a preferred embodiment of the present invention.

A flow of the update processing is shown in a flowchart of FIG. 6. This flowchart starts, in the flowchart shown in FIG. 3 or FIG. 5, at a timing when the communications CPU 61 detects completion of software downloading.

In step S21, the communications CPU 61 notifies the application CPU 71 of the completion of software downloading, whereas the application CPU 71, upon receiving the notification, displays on the display 82, for example, a message "Download completed" to indicate the completion of downloading.

In step S22, the application CPU 71 stores the downloaded software in the external storage 86 or the internal storage 89.

At this point, when it comes to a software highly advantageous to the user such as software capable of largely improving the CPU processing speed and expanding communications function, the control system 3 takes such a step as to set a flag at a header's predetermined position to differentiate the important or deemed important software from other software.

In step S23, the application CPU 71, by detecting whether or not the above-mentioned flag of the software stored in either the storage 86 or the storage 89 is set, verifies the importance of the software.

In addition, when the software stored in either the storage 86 or the storage 89 is verified to be important software, an update of the existing software is at once executed in step S26.

Specifically, when software stored in either the storage 86 or the storage 89 is software for application, the communications CPU 61 halts and controls the function of the application control processor 23 including the application CPU 71. In addition, the communications CPU 61 reads out software for communications stored in either the storage 86 or the storage 89 via the CPU I/F section 24 and updates the existing software for application stored in a ROM 72 of the application control processor 23 with new downloaded software.

If, on the other hand, software stored in either the storage 86 or the storage 89 is software for communications, the application CPU 71 halts and controls the function of the communications processor 23 including the communications CPU 61. And the application CPU 71 reads out software for communications stored in either the storage 86 or the storage 89 and updates the existing software for communications stored in a ROM 63 of the communications processor 23 with new downloaded software (a ROM becomes writable when power is turned off).

The mobile communications terminal 1 of the mobile communications system of a preferred embodiment according to the present invention has two CPUs of the communications CPU 61 and the application CPU 71. Consequently, when updating software for communications, even though the communications processor 22 is in halt condition, update processing of software for communications can be performed by the application CPU 71. When updating software for application, even though the application control processor 23 is in halt condition, update processing of software for application can be performed by the communications CPU 61.

In other words, as the other control processor's CPU can perform update processing of software even if one processor is halted, inconvenient circumstances may be prevented where the entire mobile communications terminal 1 is halted when updating software. Also, when updating software for application, the communications processor 22, while in active status, can perform update processing of the software for application, hence, in this case, while maintaining communications function, update processing of software for application may be performed.

The communications CPU 61 or the application CPU 71, upon completing an update of the software, erases updated software stored in either the storage 86 or the storage 89, in step S27.

It should be noted that, when the update processing of software is complete, the communications processor 22 or the application control processor 23 subjected to halt control at the time of updating is activated. As a result, the communications processor 22 or the application control processor 23 operates on the new updated software for communications or software for application, thus resulting in expanding the communications function or displaying a new standby image and the like.

In this manner, if the downloaded software is important software, by performing update processing without taking user's confirmation, for example, a bug of an operation system of the mobile communications terminal 1 or a malfunction of the communications function can be corrected without the user having knowledge thereof.

Further, since such update processing can be executed by distributing software from the control system 3 side, from the manufacturer's standpoint, troublesome procedures of collecting the mobile communications terminal 1 and correcting a bug or the like can be omitted. In addition, from the user's standpoint, correction of a bug or the like can be executed while being in a place of his choice, hence, a troublesome procedure of taking his mobile communications terminal 1 to a manufacturer's shop can be omitted.

Figure 7:
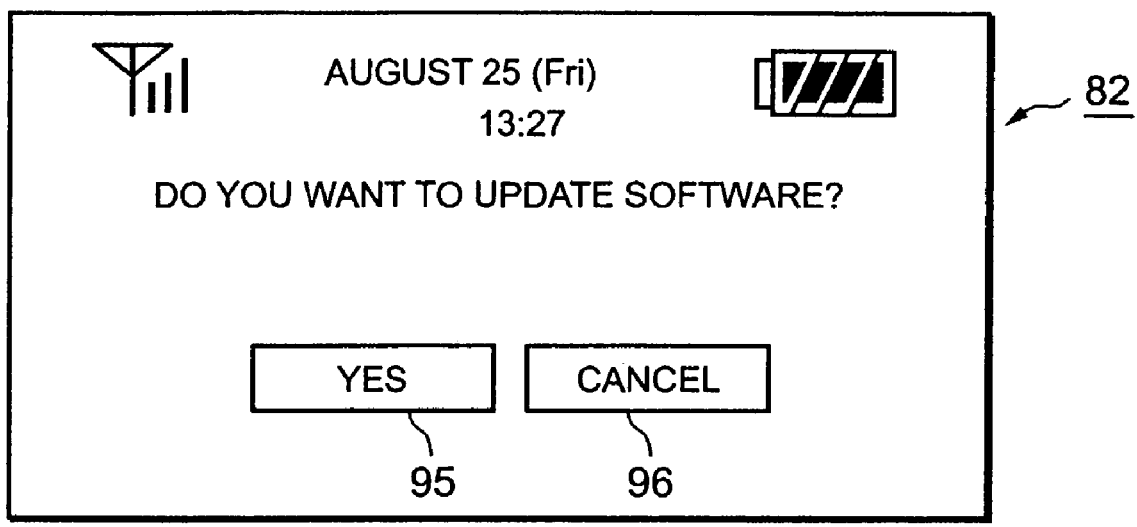
FIG. 7 is a screen for making an inquiry to the user on whether to update the software, according to a preferred embodiment of the present invention.

On the other hand, in step S23, when the software stored in either the storage 86 or the storage 89 is verified to be not the above-mentioned important software, the application CPU 71 displays and controls an update verification screen of the software on the display 82. An example of this update verification screen is shown in FIG. 7. In the case of an example in FIG. 7, together with a message such as "Do you want to update software?" to verify existence of update, the update verification screen displays an update executing button 95 (Yes) to instruct a decision to execute the update and a cancel button 96 (Cancel) to instruct cancellation of software update.

The user selects an update or no update by operating to move the cursor via the key operation section 76. In step S25, whether or not an update of software is instructed is verified by means of detection through the application CPU 71 of key operation of the key operation section 76. Specifically, it is verified that an update is instructed when the operation of the above-mentioned update decision button 95 is detected. It is verified that an update is cancelled when the operation of the above-mentioned cancel button 96 is detected.

If an update is verified to be cancelled, in step S28, together with a message "Do you want to erase data in the storage?" for example, the application CPU 71 displays and controls on the display 82 an erase decision button to instruct a data erase and a cancel button to instruct to the effect that data are not to be erased. And, when operation of the above-mentioned cancel button is detected, the application CPU 71 re-verifies an update of software by performing a routine in step S28 again.

On the other hand, when operation of the above-mentioned erase decision button is detected, the application CPU 71 verifies that a data erase is specified, and in step S27, erases software stored into either the storage section 86 or the storage section 89. This completes a routine of update processing shown in a flowchart of FIG. 6.

[An Example of Variation of Update Processing]

When operation of the cancel button is detected in step S28 so that an erase of data stored in the storage is cancelled, an update of software is once again verified in step S24. However, when operation of the cancel button is detected, it may be so arranged that the software may be updated when a routine of update processing shown in the flowchart of FIG. 6 is complete and the mobile communications terminal 1 is detected to be in a process of power charging.

At the time of power charging, the mobile communications terminal 1 is often in a status of not-in-use. Therefore, when an update and a data erase are both cancelled, an update of software may be held back until arrival of the power charging time of the mobile communications terminal 1, before the software is updated. By so doing, software may be updated by utilizing time when the mobile communications terminal 1 is not in use.

It should be pointed out that a preferred embodiment as mentioned above is just one example of the present invention. Therefore, the present invention will not be limited to the above-mentioned preferred embodiments. For example, in the description of the above-mentioned example of preferred embodiments, downloaded software is first stored in the external storage 86 or in the internal storage 89, and when updating, the software is read out from either the storage 86 or the storage 89 and updated. This may be so arranged that the downloaded software does not need to be stored in either the storage 86 or the storage 89, but an update can be directly performed.

Therefore, it should be understood by those skilled in the art that various modifications, combinations, sub-combinations and alterations may occur depending on design requirements and other factors insofar as they are within the scope of the appended claims or the equivalents thereof.

What is claimed is:

1. A mobile communications terminal comprising:
a first control means;
a second control means;
a first storage means for storing a first software program and a second software program, wherein said first software program and said second software program are respectively executed by said first control means and said second control means;
a reception means for receiving an updating software program for updating one of said first software program and said second software program stored in said first storage means,
wherein information indicating a level of importance of the software and information indicating that the updating program is executed by the first control means or by the second control means are attached to the updating software program;

a recognizing means for recognizing the level of importance of the software and recognizing the first control means or the second control means which executes the updating program; and a second storage means for storing said updating software program received by said receiving means;

wherein when said updating software program is stored in said second storage means, one of the first control means or the second control means halts processing in execution and is updated by the other of the first control means or the second control means according to the information indicating that the updating program is executed by the first control means or by the second control means by storing said updating software program in said first storage means;

wherein the first control means or the second control means which updates said updating software program in said first storage means also continues non-updating processing functions during said updating;

wherein the first control means or the second control means performs updating software program when the other processor is halted; and wherein when the level of importance of said updating software program is recognized as high, said control means executes said software program updating without a user's operation.

2. The mobile communications terminal according to claim 1, further comprising a determination means for determining whether said updating software program received by said receiving means includes an updating software program for one of said first software program and said second software program, wherein one of said first software program and said second software program is updated by said updating software program, depending on a result of said determination by said determination means.

3. The mobile communications terminal according to claim 2, wherein:

said control means that halted execution of said software program inquires to the user whether updating of software program is necessary, if the level of importance of said updating software program is recognized as low.

4. The mobile communications terminal according to claim 3, wherein, if the level of importance of said updating software program is recognized as low, said control means that halted execution of said software program performs updating of said software program when execution of said updating is designated by the user, and, if execution of said updating is not designated by the user, deletes said updating software program stored in said second storage means.

5. The mobile communications terminal according to claim 1, wherein said second storage means comprises at least one of an internal storage means built in said mobile communications terminal and an external storage means attached externally to said mobile communications terminal.

6. A mobile communications terminal according to claim 1, wherein one of said first control means and said second control means comprises a control means for communications process, and the other of said first control means and said second control means comprises a control means for application processing.

7. A method of updating software program stored in a mobile communications terminal having a first control means and a second control means, said method comprising the steps of:

receiving updating software program for updating one of a first software program and a second software program, wherein said first software program and said second software program are respectively executed by said first control means and said second control means;

wherein information indicating a level of importance of the software and information indicating that the updating program is executed by the first control means or by the second control means are attached to the updating software program;

recognizing the level of importance of the software;

recognizing the first control means or the second control means which executes the updating program;

storing said received updating software program;

halting execution of one of the first control means and the second control means; and updating the other of the first control means and the second control means that halted execution of one of said first control means and the second control means according to the information indicating that the updating program is executed by the first control means or by the second control means;

wherein the first control means or the second control means which updates the other of the first control means and the second control means also continues non-updating processing functions during said updating;

wherein the first control means or the second control means performs updating software program when the other processor is halted; and wherein when the level of importance of said updating software program is recognized as high, said control means executes said software program updating without a user's operation.

8. The method according to claim 7, further comprising a step of determining whether said received updating software program includes updating software program for one of said first software program and said second software program.

9. The method according to claim 8, said control means that halted execution of said software program inquires to the user whether updating of software program is necessary, if the level of importance of said updating software program is recognized as low.

10. The method according to claim 9, wherein, if the level of importance of said updating software program is recognized as low, said control means that halted execution of said software program performs updating of said software program when execution of said updating is designated by the user, and, if execution of said updating is not designated by the user, deletes said updating software program stored in said second storage means.

* * * * *

UNITED STATES PATENT AND TRADEMARK OFFICE
CERTIFICATE OF CORRECTION

PATENT NO. : 7,634,261 B2  
APPLICATION NO. : 10/408722  
DATED : December 15, 2009  
INVENTOR(S) : Mitsuru Goto Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1358 days.

Signed and Sealed this

Ninth Day of November, 2010

David J. Kappos  
*Director of the United States Patent and Trademark Office*